United States Patent [19]

Shuler

[11] 3,999,969
[45] Dec. 28, 1976

[54] AIR FILTERING UNIT
[75] Inventor: Bernard R. Shuler, Louisville, Ky.
[73] Assignee: American Air Filter Company, Inc., Louisville, Ky.
[22] Filed: July 21, 1975
[21] Appl. No.: 597,836
[52] U.S. Cl. .................................. 55/418; 55/496; 55/502; 55/504; 55/508; 55/DIG. 31
[51] Int. Cl.² ......................................... B01D 51/00
[58] Field of Search ............ 55/418, 478, 480, 490, 55/493, 495, 496, 501, 502, 503, 504, 508, DIG. 31, 484; 98/40 C, 108, 40 D

[56] References Cited
UNITED STATES PATENTS

| 1,801,949 | 4/1931 | Broudy et al. ........................ 55/418 |
| 1,952,989 | 3/1934 | Joseph .................................. 55/418 |
| 2,175,903 | 10/1939 | Lichtman ........................ 55/496 X |
| 2,184,095 | 12/1939 | Daly et al. ........................ 55/478 X |
| 2,203,311 | 6/1940 | Sinclair ............................ 55/496 X |
| 3,460,322 | 8/1969 | Rivers et al. ..................... 55/490 X |
| 3,740,934 | 6/1973 | Shuler ................................. 55/490 |

Primary Examiner—Frank W. Lutter
Assistant Examiner—David L. Lacey
Attorney, Agent, or Firm—Jon C. Winger

[57] ABSTRACT

An air filter unit to be installed in the wall of an air conveying conduit for filtering air as it passes between the conduit and a room includes a frame to mount a flow-through filter over an appropriate aperture in the conduit wall, a gasket between the filter and frame, a gasket between the frame and interior surface of the conduit wall, a frame collar disposed around the periphery of the frame, a clamp which causes the frame and collar to coact in a vice-like manner forcing the frame against the interior wall surface of the duct compressing the gasket therebetween, and a clamp for holding the filter in the frame. The filter unit may further include a pivotally mounted extractor plate disposed inside the conduit to selectively direct a predetermined amount of air through the filter.

13 Claims, 9 Drawing Figures

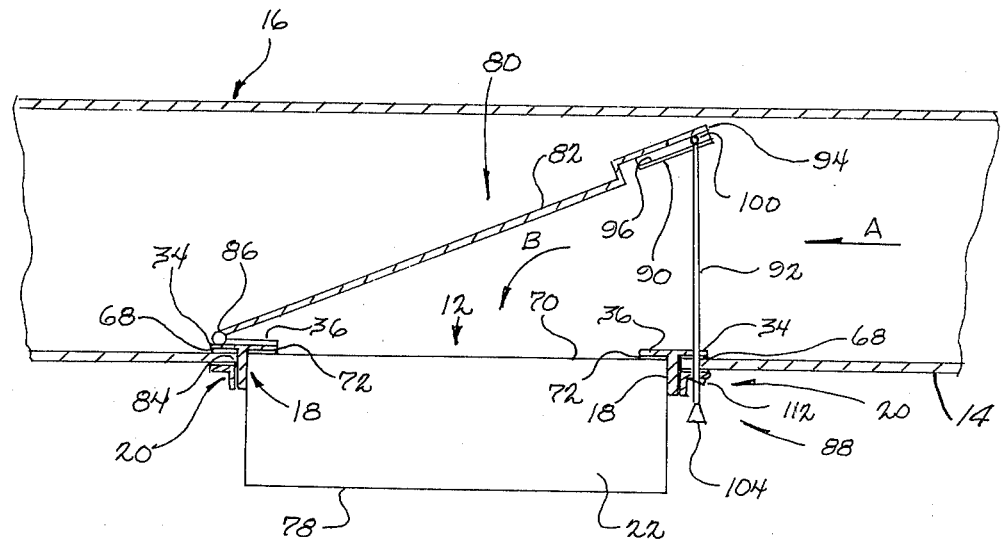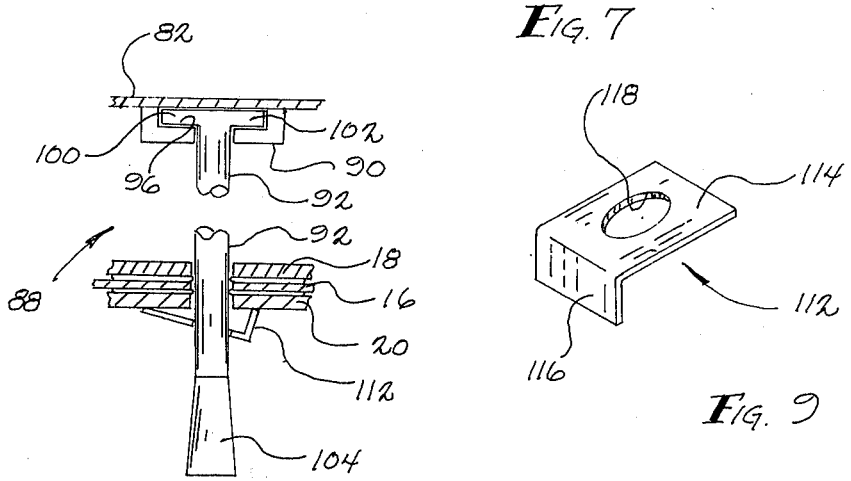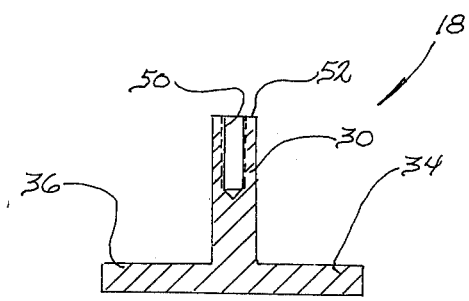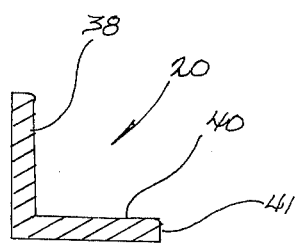

AIR FILTERING UNIT

BACKGROUND OF THE INVENTION

The present invention relates to air filtering units, and more particularly to air filtering units to be mounted in an air carrying conduit for filtering air as it passes between the conduit and a room.

In recent years, there has been considerable effort to provide rooms with a clean controlled environment. One criteria for a clean environment is a minimum amount of impurities, such as airborne dust, dirt and the like.

One of the major problems faced in accomplishing the filtration of airborne impurities from the air flowing between a room and an air carrying conduit has been the elimination of leakage around the juncture of a filter unit and the conduit. This problem been solved by heretofore known filter devices, however, the solution involved a complicated array of filter unit mounting components which have added substantially to the cost of manufacturing, shipping, installing and maintaining the filter units. A further drawback of these heretofore known units is that the seal preventing leakage between the juncture of the filter unit mounting components and conduit is broken when removing the filter. Another drawback, in some applications, has been the absence of means for controlling the amount of air flow from the conduit through the filter.

Therefore, a need exists for a fiter unit having a minimum number of components, which effectively seals against leakage at the juncture of the filter unit and air carrying conduit and which allows the filter unit conduit seal to remain undisturbed when removing the filter. Further, there exists, in some applications, an additional need for means for regulating the amount of air flowing from the conduit through the filter.

SUMMARY OF THE INVENTION

The present invention recognizes the drawbacks of the heretofore known filter units and satisfies these needs by providing a filter unit to be installed over an appropriate opening in the wall of an air carrying conduit which air filter unit comprises: a flow-through mounting frame to be removably installed in an appropriate opening in the wall of the conduit; a fluid sealing gasket interposed between said mounting frame and the conduit wall; a flow-through filter removably mounted in flow-through relationship to said mounting frame; a fluid sealing gasket interposed between said mounting frame and said filter, said frame coacting with said second mentioned gasket to create a fluid tight seal between said mounting frame and said filter; a peripheral mounting frame collar surrounding the outer periphery of mounting frame collar surrounding the outer periphery of mounting frame and coacting with said mounting frame to compress said first mentioned sealing gasket to create a fluid tight seal between said mounting frame and conduit; means for clamping said collar against an exterior wall surface of said conduit; and, means for clamping said filter in said frame.

Another construction of the present invention further provides adjustable air extractor means adjustably mounted to the mounting frame and disposed interior the conduit for selectively controlling the volume of air routed through the filter from the conduit.

DESCRIPTION OF THE DRAWINGS

A better understanding of the invention can be had by reference to the accompanying drawings in which like numerals refer to like parts throughout the several views and in which:

FIG. 3 is an enlarged cross-sectional view of a filter mounting frame of the present invention taken in a plane through line 3—3 of FIG. 2;

FIG. 4 is an enlarged cross-sectional view of a peripheral mounting collar of the present invention taken in a plane through line 4—4 of FIG. 2;

FIG. 7 is an enlarged cross-sectional view of the air filter unit taken in a plane through line 7—7 of FIG. 1 and showing an air extractor of the present invention;

FIG. 8 is a foreshortened view of an actuator for the air extractor; and,

FIG. 9 is a perspective view of a locking device of the extractor.

DESCRIPTION OF THE PREFERRED EMBODIMENT

Figure 1:
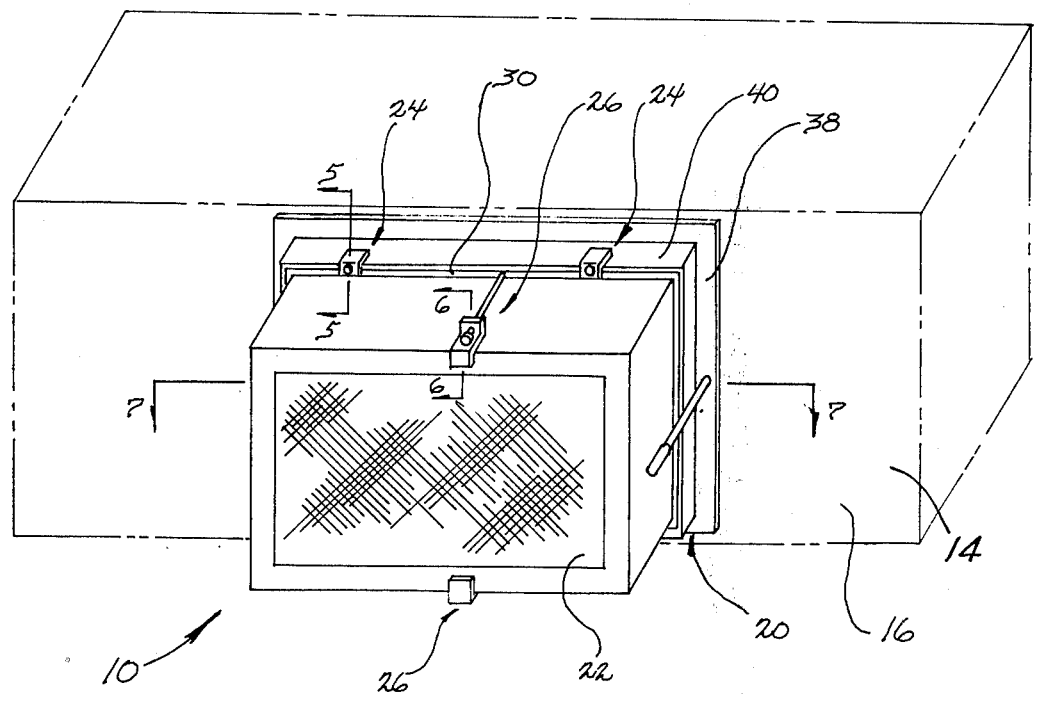
FIG. 1 is a perspective view of an air filter unit of the present invention mounted to an air conveying conduit.
Figure 2:
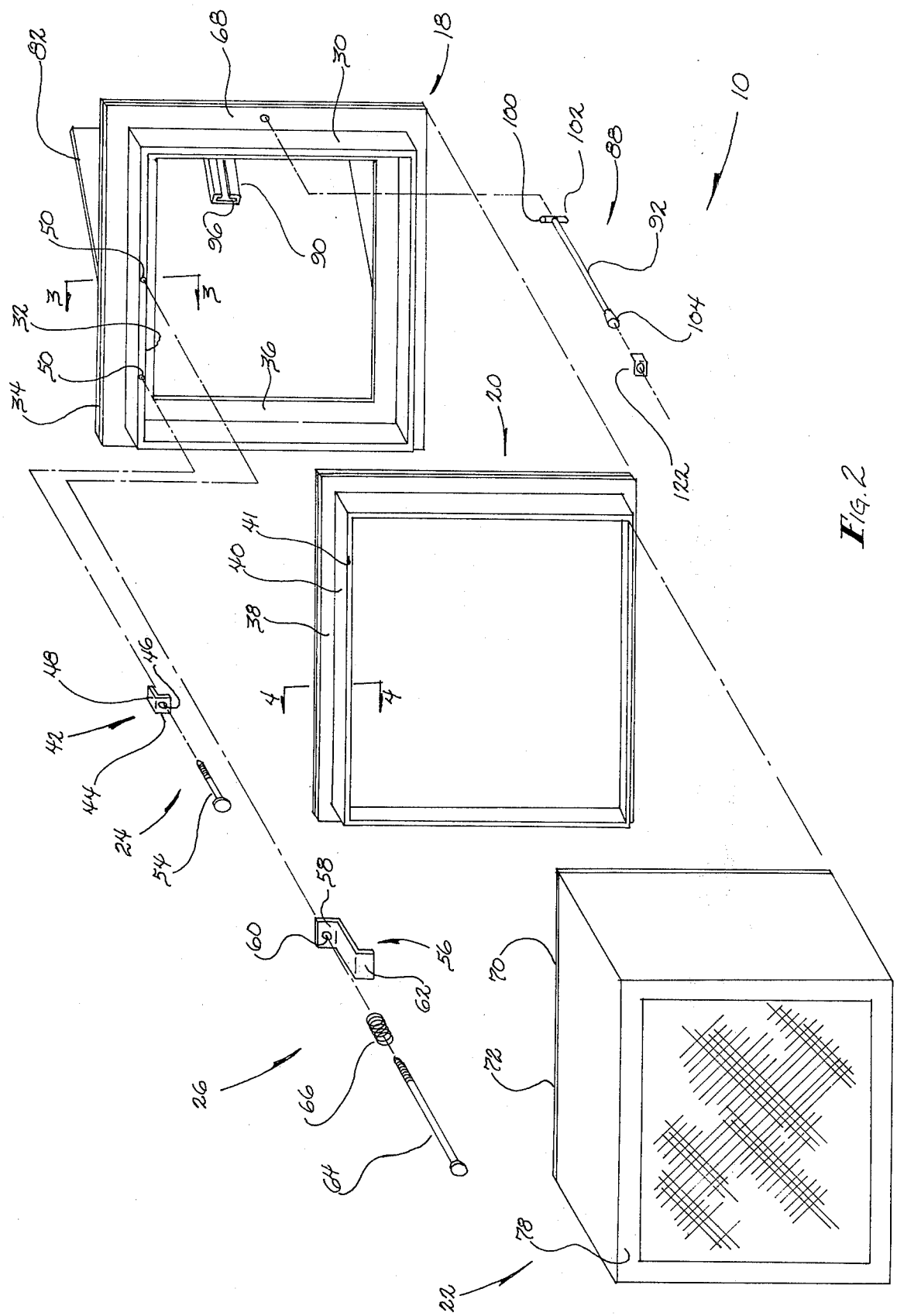
FIG. 2 is an enlarged exploded perspective view of the air filter unit of the present invention.

FIGS. 1 and 2 illustrate an air filter unit, generally denoted by the numeral 10, installed in an appropriate opening in a wall 14 of an air carrying conduit 16. The air filter unit 10 comprises a flow-through mounting frame 18 to be inserted through the opening, a peripheral mounting collar 20 which fits around the periphery of the frame 18 and a flow-through filter element 22 which fits in the flow-through frame 18. The present invention further comprises clamping means 24 for concurrently clamping the collar 20 against the exterior surface of the conduit wall 14 and clamping the frame 18 against the interior surface of the conduit wall 14, and clamping means 26 for clamping the filter element 22 to the frame 18.

Figure 5:
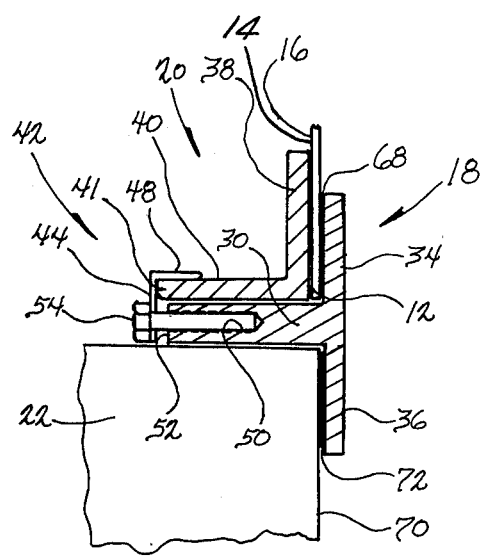
FIG. 5 is an enlarged fragmented sectional view of the air filter unit taken in a plane through line 5—5 of FIG. 1.
Figure 6:
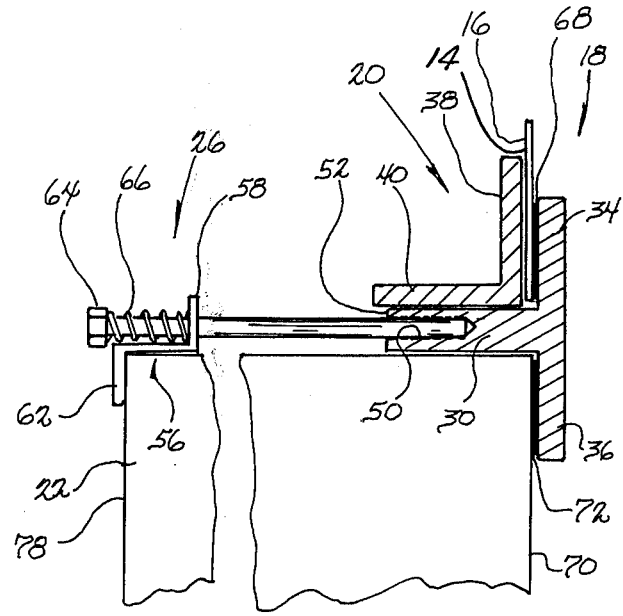
FIG. 6 is an enlarged fragmentary sectional view of the air filter unit taken in a plane through line 6—6 of FIG. 1.

With particular reference to FIGS. 3, 5 and 6, the flow-through filter mounting frame 18 is formed of a framework having a generally T-shaped cross-section, the stem 30 of the T-shape defining a flow-through aperture 32 while the arm 34 extending outwardly of the aperture 32 is a frame sealing flange and the other arm 36 extending inwardly of the aperture 32 is a filter element sealing flange.

Now with reference to FIGS. 2, 4 and 5, the peripheral collar 20 is formed of a framework having a generally L-shaped cross-section, one leg 38 being adapted to abut the outside wall surface of the conduit wall 14 adjacent the opening and the other leg 40 being adapted to be disposed in parallel adjacent relationship to the stem 30 of the mounting frame 18.

Clamping means 24 is best illustrated in FIGS. 2 and 5 and comprises a generally L-shaped bracket 42, one leg of which is a collar engaging flange 44 having an appropriate bolt receiving aperture formed therein and the other leg of which is a collar engaging lip 48; a threaded bolt receiving bore 50 formed in the free edge 52 of the frame stem 30; and a bolt 54 receivable through the aperture formed in the collar engaging flange 44 and in the threaded bore 50.

Clamping means 26 is best illustrated in FIGS. 2 and 6 and comprises a generally Z-shaped bracket 56, one leg 58 of which has an appropriate bolt receiving aperture formed therein and the other leg of which being a filter element engaging flange 62; another threaded bolt receiving bore 50 formed in the free edge 52 of the frame stem 30; a bolt 64 receivable through the bolt receiving aperture in the leg 58 and in the threaded bore 50; and a compression coil spring 66 received coaxially over the shank of the bolt 64 between the bolt head and leg 58 of the Z-bracket 56 for biasing the filter engaging flange 62 against the face 78 of the filter element 22.

FIGS. 1, 2, 5 and 6 illustrate how the filter unit 10 is assembled and mounted to the conduit. The opening in the conduit wall 14 is sized slightly larger than the flow-through aperture 32 defined by the frame stem 30. The filter mounting frame 18 is inserted through the opening 12 in the conduit wall 14 and positioned such that its frame sealing flange 34 is contiguous to the interior surface of the conduit wall 14 adjacent the opening in the conduit wall 14 and such that the stem 30 extends outwardly of the conduit through the opening in the conduit wall 14. A gasket 68 is interposed around the frame sealing flange 34 and between the interior surface duct wall 14 and the frame sealing flange 34. The peripheral mounting collar 20 is placed over the mounting frame 18 such that the leg 38 is disposed in abutting juxtaposition to the outside surface of the conduit wall 14 adjacent the opening in the conduit wall 14 opposite the frame sealing flange 34 and the leg 40 is located adjacent to and encompasses the stem 30 defining the flow-through aperture 32. The flow-through filter element 22 is inserted generally coaxially into the flow-through aperture 32 such that the upstream edges 70 of the filter element 22 are contiguous to the filter element sealing flange 36 of the frame 18. A peripheral gasket 72 is interposed between the upstream filter edges 70 and filter element sealing flange 36.

As can be best seen in FIG. 5, the collar 20 and filter mounting frame 18 are tightly secured to the conduit by clamping means 24 by placing the collar engaging flange 44 of the bracket 42 against the free edge 41 of the leg 40 of the collar 20 with the collar engaging lip 48 extending over the collar leg 40 adjacent the free edge 41. The bolt 54 is inserted through the bolt receiving aperture in flange 44 and threaded into the threaded bolt receiving bore 50 in stem 30 concurrently forcing the collar leg 38 against the exterior wall surface of the conduit wall 14 and drawing the mounting frame 18 outwardly of the conduit forcing the frame sealing flange 34 toward the interior wall surface of the conduit wall 14 in a vice-like manner, thus, compressing the peripheral gasket 68 between the interior wall surface of the conduit wall 14 and frame sealing flange 34 thereby creating a gas tight seal.

The filter element 22 is tightly secured in the flow-through aperture 32 of the frame 18 by the clamping means 26. The Z-shaped bracket 56 is positioned with its filter element engaging flange 62 in contact with downstream edge 78 of the filter element 22. The bolt 64 is inserted through the bolt receiving aperture in the leg 58 and threaded into the bore 50 with the compression coil spring 66 captured between the head of the bolt 64 and leg 58. The bolt 64 is threaded into the bore 50 compressing the coil spring 66 between the bolt head and leg 58 until the coil spring exerts a sufficient force on the leg 58 to cause the filter element engaging flange 62 to force the filter element 22 into the flow-through aperture 32 toward the filter sealing flange 36 of the frame 18 compressing the periperal gasket 72 disposed between the filter sealing flange 36 and upstream edges 70 of the filter element 22 creating a gas tight seal.

It can be seen that the filter element 22 can be easily removed from the mounting frame 18 by removing the clamping means 26 without disturbing the clamping means 24, thus, leaving the seal between the frame 18 and the interior wall surface 14 of the conduit 16 undisturbed and intact.

While only a single clamping means 24 and a single clamping means 26 are alluded to in the above description, it should be understood that a number of clamping means 24 and a number of clamping means 26 are used. Preferrably, the number of clamping means 24 and a number of clamping means 26 used will be sufficient to exert balanced forces around the periphery of the filter collar 20 and filter element 22, respectively, the exact number being dependent on various design parameters such as the peripheral size of the unit and composition of the material from which the peripheral gaskets 68 and 72 are formed.

An additional feature of the present invention is an adjustable air extractor means 80 which is illustrated in FIGS. 2 and 7. The adjustable air extractor means 80 is disposed interior the conduit 16 and controls the volume of air routed through the filter element 22 from the conduit. The extractor means 80 comprises a baffle plate 82 pivotally connected to the filter mounting frame 18 proximate the downstream edge 84 of the opening in the wall 14 of the conduit 16 by means of, for example, a hinge 86. Thus, the baffle plate 82 can be selectively pivoted about the hinge 86 to open against the air stream (indicated by flow arrow A) to catch or obstruct the continued flow of air through the conduit at the opening in the conduit wall 14 and channel a selected amount of the air flow into the opening in the conduit 14 (indicated by flow arrow B) and, hence, through the filter element 22. The baffle plate 82 is selectively pivoted about the hinge 86 by manipulating baffle adjusting means, generally denoted by the numeral 88, from outside the conduit 16 (see FIGS. 1, 2, 7 and 8). Baffle adjusting means 88 is illustrated as comprising an elongated channel block 90 and an activating rod 92 slidably connected in the channel block. The channel block 90 is attached to the baffle plate 82 proximate the upstream edge 94 of the plate such that the longitudinal axis of a T-shaped channel 96 formed in the channel block is oriented perpendicularly to the pivotal axis of the hinge 86. The activating rod 92 comprises oppositely extending transverse pins 100 and 102 disposed at one of its ends and an operators handle 104 at its other end. The pins 100 and 102 are slidably received in the T-shaped channel 96 and the other end of the rod 92 extends through appropriate holes formed in the frame sealing flange 34 of the frame 18, conduit wall and wall abutting leg 38 of the collar 20, respectively, thus, positioning the operators handle 104 outside the conduit 16. The gasket 68 compressed between the conduit wall and frame sealing flange 34 also seals around the rod 92. The baffle plate 82 can be fixed in a selected position obstructing the air flow by means of a keeper 112 (see FIGS. 8 and 9). The keeper 112 consists of a main body portion 114 having a depending flange 116 disposed at approximately a right angle to the main body portion 114 and an aperture 118 formed in the main body portion to receive the rod 92. The diameter of the aperture 118 is larger than the diameter of the rod 92 so that the main body portion 114 can be tilted at an acute angle relative to the longitudinal axis of the rod 92. To lock the rod 92 in a predetermined position, the keeper 112 is moved along the rod 92 until the depending flange 116 contacts the conduit wall abutting flange 38 of the collar 20 causing the main body portion to assume an acute angle relative to the rod 92, thus, moving the edges of the main body portion 114 defining the aperture 118 into contact with the rod 92 on opposite sides thereof. The friction between the edges defining aperture 118 and the rod 92 prevents the shaft from inadvertent axial movement.

The foregoing detailed description is given primarily for clearness of understanding and no unnecessary limitations should be understood therefrom, for modifications will be obvious to those skilled in the art upon reading this disclosure and may be made without departing from the spirit of the invention or the scope of the appended claims.

What is claimed is:
1. An air filtering unit comprising:
a flow-through filter mounting frame;
a flow-through filter removably mounted in flow-through relationship to said mounting frame;
first gasket means to create a fluid tight seal around said mounting frame;
second gasket means disposed between said mounting frame and said filter;
a peripheral mounting frame collar surrounding the outer periphery of said mounting frame and coacting with said mounting frame to compress said first gasket means to create a fluid tight seal around said mounting frame;
means for clamping said collar to said mounting frame and compressing said first gasket means therebetween; and,
means for clamping said filter in said frame.

2. An air filter unit as defined in claim 1, wherein said filter mounting frame comprises:
a filter sealing flange, said filter being disposed in juxtaposition with said filter sealing flange with said second gasket means interposed therebetween; and,
a frame sealing flange said first gasket means being disposed in juxtaposition to said frame sealing flange to create the fluid tight seal around said mounting frame.

3. The filter unit as defined in claim 2, wherein:
said flow-through filter mounting frame comprises a framework having a generally T-shaped cross-section, the stem of said T-shape defining a flow-through aperture, one arm of said T-shaped framework extending inwardly of said flow-through aperture and being said filter sealing flange, and the other arm of said T-shaped framework extending outwardly of said flow-through aperture and being said frame sealing flange; and,
said filter being removably received in said flow-through aperture.

4. The filter unit as defined in claim 3, wherein said peripheral frame collar comprises a framework having a generally L-shaped cross-section, one leg thereof being adapted to be disposed in generally parallel relationship to said frame sealing flange of said filter mounting frame, and the other leg thereof being disposed adjacent and encompassing said stem of said filter mounting frame.

5. The filter unit defined in claim 4, wherein said means for clamping said collar to said mounting frame comprises:
at least one bracket for engaging the free edge of the other leg of said L-shaped peripheral frame collar; and,
means for adjustably attaching said at least one bracket to said mounting frame and for forcing said one leg of said collar which is generally parallel to said frame sealing flange and said mounting frame sealing flange to move toward each other in a vice-like manner, thus, compressing said first gasket means disposed therebetween.

6. The filter unit defined in claim 5, wherein said adjustable attaching means comprise:
means defining at least one threaded aperture in the stem of said T-shaped mounting frame open to the free edge of said stem;
means defining a hole in said at least one bracket; and,
a bolt received through said hole in said at least one bracket and threadably received in said threaded aperture in said stem, whereby, as said bolt is threaded into said threaded aperture in said stem said at least one bracket moves into engagement with said free edge of said other leg of said collar.

7. The filter unit defined in claim 3, wherein said filter clamping means comprises:
means defining at least one threaded aperture in said stem of said T-shaped frame open to the free edge of said stem;
a bolt threadably received in said threaded aperture; and,
a bracket for engaging said filter, said bracket being slidably mounted on said bolt, whereby as said bolt is threaded into said threaded aperture, said filter engaging bracket engages said filter, thus, forcing said filter against said filter sealing flange and compressing said gasket means disposed therebetween.

8. The filter unit as defined in claim 7, wherein said filter clamping means further comprises biasing means for exerting a constant biasing force on said filter engaging bracket in a direction toward said mounting flange.

9. The filter unit as defined in claim 8, wherein said biasing means comprises a compression coil spring coaxially disposed over the shank of said bolt between said filter engaging bracket and the head of said bolt.

10. An air filter unit as defined in claim 1, and further comprising an extractor baffle plate pivotally connected to said mounting frame for selectively variably obstructing the air flow path through said filter and for channeling an air stream to be filtered into said filter.

11. An air filter unit as defined in claim 10, wherein said baffle plate is pivotally connected to one side of said filter mounting frame.

12. An air filter unit as defined in claim 11, and further comprising means for selectively pivotally moving said baffle plate.

13. An air filter unit as defined in claim 12, and further comprising means for fixing said baffle plate in a preselected position.

* * * * *

UNITED STATES PATENT OFFICE
CERTIFICATE OF CORRECTION

Patent No. 3,999,969   Dated Dec. 28, 1976

Inventor(s)   Bernard R. Shuler

It is certified that error appears in the above-identified patent and that said Letters Patent are hereby corrected as shown below:

Column 1, line 31, "fiter" should read -- filter --.

Column 1, lines 56 and 57, delete "the outer periphery of mounting frame collar surrounding".

Signed and Sealed this

Twelfth Day of April 1977

[SEAL]

Attest:

RUTH C. MASON
Attesting Officer

C. MARSHALL DANN
Commissioner of Patents and Trademarks